US 6,555,010 B2

(12) United States Patent
Barrett

(10) Patent No.: US 6,555,010 B2
(45) Date of Patent: Apr. 29, 2003

(54) SOLUTION MINING PROCESS FOR REMOVING METALS FROM AQUEOUS SOLUTION

(76) Inventor: Keith Barrett, 1102 Goldenrod Cir., Broomfield, CO (US) 80020

( * ) Notice: Subject to any disclaimer, the term of this patent is extended or adjusted under 35 U.S.C. 154(b) by 0 days.

(21) Appl. No.: 09/783,223

(22) Filed: Feb. 14, 2001

(65) Prior Publication Data

US 2001/0050255 A1 Dec. 13, 2001

Related U.S. Application Data

(60) Provisional application No. 60/191,130, filed on Mar. 22, 2000.

(51) Int. Cl.⁷ .................................................. C02F 1/52
(52) U.S. Cl. ................ 210/710; 210/712; 210/714; 210/725; 210/727; 210/730; 210/748; 210/769; 210/770; 210/912; 75/427; 75/428; 75/633; 75/634; 75/637; 205/751; 205/771
(58) Field of Search ............... 75/426–428, 631–633, 75/634, 637; 205/742, 771, 751; 210/710, 712, 714, 724, 725, 726, 727, 730, 748, 768, 769, 770, 912

(56) References Cited

U.S. PATENT DOCUMENTS

| 4,102,784 A | | 7/1978 | Schlauch ................ 210/47 |
| 4,135,923 A | * | 1/1979 | Day ........................ 75/153 |
| 5,660,735 A | | 8/1997 | Coltrinari et al. ....... 210/723 |
| 5,695,647 A | * | 12/1997 | Carbonell et al. ....... 210/724 |
| 5,698,107 A | | 12/1997 | Wurzburger et al. ..... 210/695 |
| 5,908,559 A | | 6/1999 | Kreisler ................... 210/710 |
| 5,925,256 A | | 7/1999 | Strauel ..................... 210/724 |

* cited by examiner

Primary Examiner—Peter A. Hruskoci
(74) Attorney, Agent, or Firm—Welsh & Katz, Ltd.

(57) ABSTRACT

A process is disclosed for obtaining colloid-forming metal particles from an aqueous mine waste solution containing that metal in ionic form. In accordance with this process, an aqueous mine waste solution containing that metal in ionic form is provided having a pH value of about 4.0 to about 6.5. The solution is electrified with direct current a about 1.2 to about 2.0 volts to reduce the desired metal ions to colloidal metal particles. A slurry of cellulose particles is agitatingly added to the colloid composition followed by a flocculant to form a solid phase cellulosic floc containing the colloid. The solid and liquid phases are separated, and the solid phase is dried, fluxed and heated to a temperature sufficient to melt the flux and colloid and form larger metal particles that can then be recovered. The colloid-forming metal is preferably gold.

20 Claims, 1 Drawing Sheet

SOLUTION MINING PROCESS FOR REMOVING METALS FROM AQUEOUS SOLUTION

This application is a continuation-in-part of Provisional application Ser. No. 60/191,130, filed Mar. 22, 2000.

DESCRIPTION

1. Technical Field

The present invention relates to the fields of mining and water reclamation, and more particularly to a process for removing colloid-forming metals from aqueous solutions containing those metals in ionic form.

2. Background of the Invention

Metal mining operations often result in an ecological waste land surrounding the mine. In addition to unsightly mounds of mine spoil that often dot the adjacent landscape, metal salts and oxides present in those spoil mounds as sulfides or are oxidized over time to sulfuric and sulfurous acids. Those acids interact with other salts present to form hydrochloric and nitric acids that further dissolve ores present in the spoil mounds, releasing metallic ions to the local aqueous environment and water table. In addition, similar conditions exist within the mines themselves, which leads to a build up within abandoned mines of water containing unacceptable amounts of dissolved metals, many of which are poisonous to plants, animals and man.

The states of Colorado, California, Alaska, Wyoming and Montana in the U.S.A. contain several abandoned mines containing metal ion-contaminated waters within the mines themselves or on nearby lands. Such water contamination can also occur in wells, springs, and both liquid and geothermal flows.

Aside from the toxic metals present in such waters, some waters also contain dissolved precious metals such as gold, silver and the platinum group metals including platinum, palladium, and rhodium, as well as copper. Some of these waters are relatively free of toxic metal ions, whereas other waters contain extremely toxic concentrations of poisonous metal ions. Less economically important metals that can also be present include iron, manganese, zinc, lead, tin, and arsenic.

Water containing colloid-forming metal ions that is present at mining operation sites, as in the mines themselves or draining from spoil mounds at mining sites, or water draining from off site spoil mounds, as well as streams and aquifers polluted by run off or seepage from mining operations is collectively referred to herein as mine waste water. It would be economically beneficial if those colloid-forming metals could be removed from the aqueous mine waste water solutions that contain them. Those economic benefits can come from recovery and sale of the metals themselves such as gold, silver and the platinum group, as well as from the removal of the metal ions present to provide less polluted, useful water. The process described below provides one such process that can remove colloid-forming metals from metal ion-containing water.

BRIEF SUMMARY OF THE INVENTION

A process is contemplated for obtaining colloid-forming metal particles from an aqueous solution containing those metals in ionic form. In accordance with a contemplated process, an aqueous mine waste water solution containing a desired colloid-forming metal in ionic form is provided having a pH value of about 4.0 to about 6.5. Direct current at about 1.2 to about 2.0 volts is passed through the solution for a time period sufficient to convert the desired metal ions into colloidal metal and form a colloidal metal-containing composition. The solution is preferably agitated during that passage of current. Cellulose particles are admixed with agitation with the colloidal metal-containing composition to form an agitated slurry of cellulose particles admixed, preferably homogeneously admixed, with the colloidal metal. A flocculating agent is thoroughly admixed with the agitated slurry to form a settling composition containing a cellulosic floc. The settling composition is maintained in the absence of agitation for a time period sufficient to form two phases, a first phase that contains water and a solid phase comprising colloidal metal entrapped within a cellulosic floc and a second, aqueous, liquid phase having a reduced concentration of desired metal ("discharge water"). The solid and liquid phases are separated. The solid phase is dried, fluxed and heated to a temperature sufficient to melt the colloidal metal present to form larger particles of the desired metal and to burn off the cellulosic floc. The desired metal larger particles are typically collected. The separated liquid phase is usually returned to the source from which it was obtained, albeit typically at a down stream position relative to the position from which it was obtained.

A contemplated process can be carried out in a batch process, as a continual or a continuous process, as is desired. In preferred processes, the desired colloid-forming metal is gold or a platinum group metal.

The present invention has several benefits and advantages.

One benefit is that use of a contemplated process can result in the economic recovery of metals from mine waters having about 5 to about 1500 ppb of a desired metal such as gold.

An advantage of the present invention is that its use can provide enhanced water quality through removal of metal ions from mine waters.

Another benefit of the invention is that greater than about 90% of the desired metal present in the original mine water can be recovered using a contemplated process.

Still further benefits and advantages of the invention will become apparent to the skilled worker from the description that follows.

BRIEF DESCRIPTION OF THE DRAWINGS

In the drawings forming a portion of this disclosure.

DETAILED DESCRIPTION OF THE INVENTION

Figure 1:
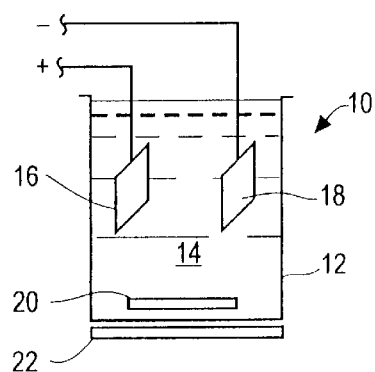
FIG. 1 illustrates an exemplary apparatus for carrying out the solution mining process for removing metals from an aqueous solution, the apparatus being arranged for batch processing.

A process is described for obtaining; i.e., removing and preferably recovering, a desired colloid-forming metal; i.e., one or more desired colloid-forming metals, from an aqueous solution that contains the desired metal in ionic form, usually in the presence of one or more less desired metal ions. A contemplated process is particularly useful in recovering precious metals such as gold, silver and the platinum group of metals from mine waste waters.

In accordance with a contemplated process, an aqueous mine waste water solution containing a desired colloid-forming metal in ionic form is provided having a pH value of about 4.0 to about 6.5, and more preferably about 4.0 to about 5.0. Exemplary useful mine waste water contains about 0.005 to about 1.5 milligrams per liter (mg/L) or about 0.005 to about 1.5 parts per million (ppm) of the desired metal ions such as gold. For example, mine drainage water has been found to contain about 0.016 to about 0.785 ppm of gold, whereas stream water has been found to contain about 0.005 to about 1.35 ppm gold.

In usual practice, naturally occurring mine waste water is quite acidic and has a pH value of about 1 to about 3. The pH value is therefore usually adjusted upwardly to provide the desired pH value by addition of a water-soluble base. The base used can be substantially any water-soluble alkaline material, although it is desirable to use as little as possible and the least expensive base, as well as a base whose cation portion does not increase the toxicity or environmental hazard of the mine waste water. Exemplary bases include sodium hydroxide, which is preferred, potassium hydroxide, magnesium hydroxide and calcium hydroxide. Ammonium hydroxide is usually avoided as ammonia can form complexes with some of the desired metal ions such as silver and copper.

This pH value adjustment alters the condition of the solution to help keep the metal ions from precipitating as a salt. Particularly when ions of non-desired (non-target) metals are present, the solution has a tendency toward precipitation of these ions as a salt; and this precipitation causes co-precipitation of the target ions as well. When this occurs, the refining process is more extensive and expensive.

Direct current at about 1.2 to about 2.0 volts, and preferably about 1.2 to about 1.8 volts, is passed through the solution using electrodes immersed in the aqueous solution for a time period sufficient to convert the desired metal ions into colloidal metal and form a colloidal metal-containing composition. The solution is preferably agitated as by stirring during that passage of current. For a one liter laboratory batch process, passage of direct current for a time period of about 2 to about 10 minutes, and more usually about 4 to about 8 minutes, is sufficient to convert ionic gold to colloidal gold using a voltage of about 1.2 to about 1.8 volts with a resultant recovery of about 68 to about 90 percent of the gold originally present in naturally occurring mine waste water.

The electrification step reduces the solution overall and particularly the ions of the target metal. The amount of voltage to be applied is a function of the target metal. Appropriate voltages for reducing different metal ions to the unionized metal can be found in several text books such as the *Handbook of Chemistry and Physics*, CRC Press, Cleveland, Ohio.

Given the minimal flow of current required because of the relatively low concentration of target metal ions present, the time required for exposure to electrons is inversely proportional to the vigor with which the solution is agitated and the size of the electrodes used. In a 1 liter batch laboratory procedure, a magnetic stir bar is used for agitation and electrodes of 1 inch square mesh are used at the specified voltage and time period noted before.

Upon completion of the electrification step, the electrodes are removed from the formed colloidal metal-containing composition. Cellulose particles are admixed with agitation with the colloidal metal-containing composition to form an agitated slurry of cellulose particles admixed, preferably homogeneously admixed, with the colloidal metal to thoroughly contact the entire volume of the solution with the cellulosic particles.

The cellulose particles are preferably obtained from waste news papers that have been macerated in water to form a pulp. The waste news paper is preferably free of dirt and other particulate matter. The amount of cellulose particles utilized can vary widely. Thus, about 0.1 to about 5 percent of the volume, but is typically about 0.25 percent of the volume of the colloidal metal-containing composition used. Agitation of the slurry is continued for a time period sufficient for the cellulose particles to contact and adhere to the colloidal metal particles.

A flocculating agent is thoroughly admixed with the agitated slurry to form a settling composition. Flocculating agents are well-known in the art and substantially any such agent can be used. Exemplary flocculating agents include guar gum, which is particularly preferred, Stin Hall™ M40 or MDD, Densefloc™ 30, DeQuat™ P-6253, Eastman™ AQ polymer, Octopol™ SDE-25 and Merquat™ 100. The amount of flocculant added is that which is sufficient to induce precipitation of the cellulose particles and that amount varies with the flocculant and the amount of cellulose particles present, but is easily determined by observation of the slurry upon incremental additions of the flocculent. Once precipitation begins, agitation of the formed settling composition is stopped, and solid [flocculated cellulose fibers (cellulosic floc) containing the desired colloidal metal] and liquid phases are formed.

The solid and liquid phases are then separated. In one embodiment, the settling composition is maintained in the absence of agitation for a time period sufficient to form two separated phases, a first phase that contains water and a solid phase comprising colloidal metal entrapped within a cellulosic floc and a second, aqueous, liquid phase having a reduced concentration of desired metal. In a laboratory process, settling is typically carried out in the same container used for the prior steps, and the majority of the phase separation is carried out by simple decantation followed by filtration or centrifugation or the like. The two phase system so formed can also be filtered or centrifuged without a separate settling step if desired.

Figure 2:
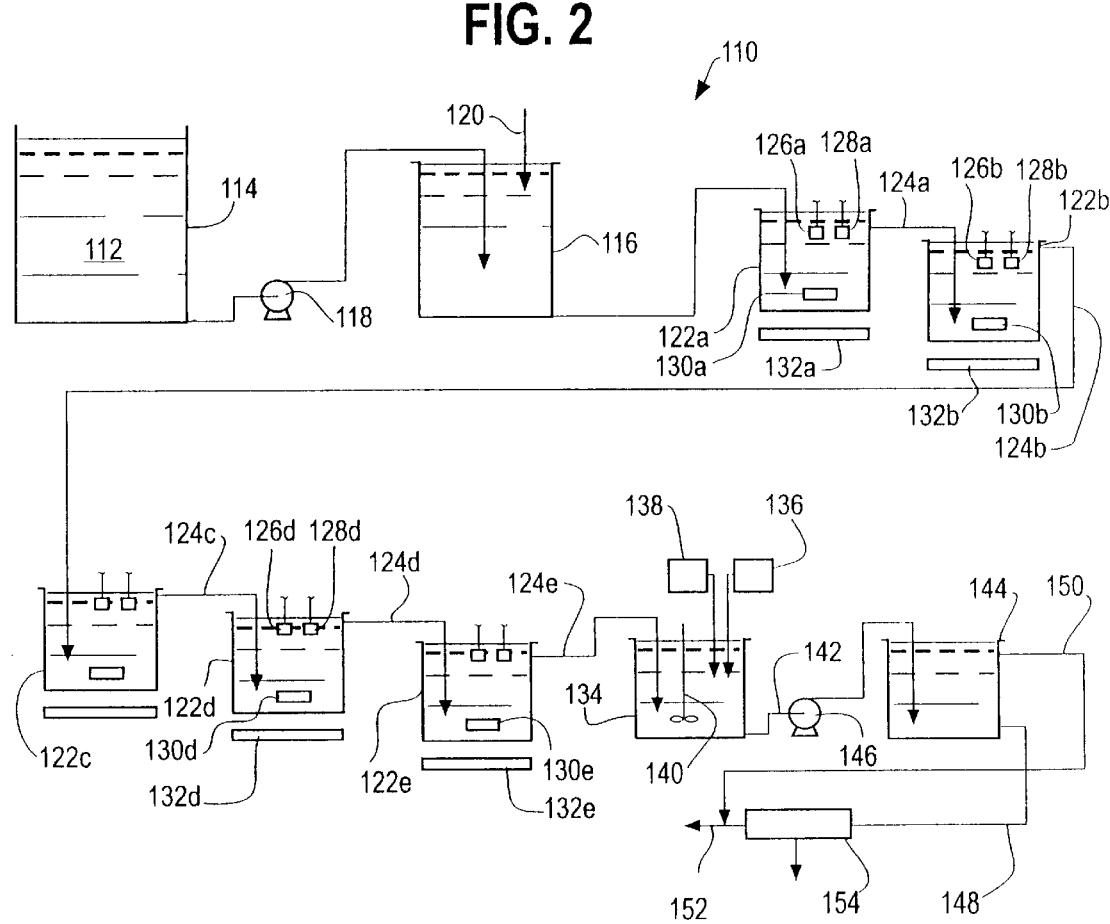
FIG. 2 illustrates an exemplary apparatus for carrying out the solution mining process, the apparatus being arranged for continuous processing.

In a larger continuous or continual process where hundreds of gallons of liquid or more are processed, a settling step is preferred and is typically carried out in one or more appropriately sized settling tanks as are depicted in FIG. 2. In this embodiment, the second, aqueous, liquid discharge water phase having a reduced concentration of desired metal is taken from at or near the top of the settling tank, whereas the water-containing solid phase is taken from at or near the bottom of the settling tank. The water-containing solid phase is then filtered or centrifuged or otherwise treated to remove as much water from the solid phase as possible. If the second, aqueous, liquid phase having a reduced concentration of desired metal is not clear, the entire volume of fluid must be filtered and dried, although such filtration can be carried out by separate filtration of centrifugation of the two phases.

In batch runs, filtration is accomplished on a filter plate adequate for the volume of the batch (e.g., 1 liter batches were captured on a 15 inch filter plate). In continuous processing, the filtration is accomplished on media sized appropriately for the flow volume such that all solids and pulp are captured, and the remaining clear fluid is continuously passed through the filter as can be accomplished using a continuous process filtration medium such as a moving screen.

In either of the above embodiments, the second, aqueous, liquid phase having a reduced concentration of desired metal is typically returned to the local environment, typically at a down stream position relative to the source from which it was taken. The discharge water liquid phase thus treated has a pH value that is much less acidic than that originally obtained and contains fewer metal ions. In preparation for returning this liquid phase to the environment, the liquid can be treated to again adjust its pH to a still higher value toward neutrality. This is done to decanted water phase as well as to the water phase that passes through the filter in the preceding step. The adjustment can be accomplished with sodium carbonate, which is environmentally benign.

The solid phase is dried, fluxed and preferably first heated at a lower temperature sufficient to char the cellulosic floc and then heated at a higher temperature sufficient to melt the flux and colloidal metal present to form larger particles (i.e., larger than colloidal sized particles, and typically sand grain size or larger) of the desired metal and to burn off the cellulosic floc. The desired metal particles are typically collected. The preference is for air drying the solids and paper pulp for 24 hours and this is the method usually employed for batch process. In continuous or continual flow processing, however, air drying may not be convenient. In these cases, other methods can be used such as heating with the hot gas stream created in the burning step that follows.

The dried material is shredded and mixed with flux. The flux should be a "standard charge" as described in standard fire assay procedures. *Scott's Standard Methods of Chemical Analysis*, $5^{th}$ Ed., Vol. 1, N. H. Furman, ed., Van Nostrand Co., Inc. (1939), p. 835–860. These procedures specify the type of flux to be used, dependent on the target material, and the mass of flux, which is dependent on the mass of the solids and the size of the crucible.

In this step, the metal flow from the fluxing process is refined to further separate the target metal from any others that the process has also captured. While the intent of the process is to avoid refining to as great an extent possible, there is still the possibility that non-target metals can contaminate the process. Non-target metals that require a voltage close to that of the target metal can be captured by the process due to variation in the control of voltage applied.

An exemplary flux composition is provided in the table below for use where the charred cellulosic floc is used as a reducing agent for the flux. About 90 to about 100 grams of flux are used per one liter laboratory batch, whereas about 100 kilos of flux are used for the 320 gallon continuous or continual procedure.

| Exemplary Flux | |
| --- | --- |
| Component | Weight (grams) |
| Soda ash | 1540 |
| Litharge (PbO) | 3150 |
| Borax | 770 |
| Silica | 490 |
| Fluorspar (CaF$_2$) | 490 |
| Flour | 105 |
| Total | 6545 |

The efficiency of the process is hampered significantly as the concentration of diverse ions other than the desired metal increases. An example of this is a solution in which gold is the desired metal and iron and manganese ions are also present. The higher the concentration of non-desired ions in the solution, the lower the potential effectiveness of the process (where effectiveness is defined as the ability of the process to capture a high proportion of the ions of the desired metal). The more diverse the non-desired ions present in the solution, the less efficient the process (where efficiency is defined as the cost to operate the process compared to the economic value of the product). Efficiency declines as ion diversity increases due to the difficult and costly ultimate separation of those metals from the target metal through a refining step.

FIGS. 1 and 2 illustrate two exemplary processing schemes for carrying out the present process. FIG. 1 illustrates a batch process; FIG. 2 illustrates a continuous process.

The exemplary batch or laboratory apparatus, indicated generally at 10, in FIG. 1 includes a tank or container 12 that is charged with a quantity of mine waste water 14. Electrodes, such as the illustrated cathode 16 and anode 18 are positioned in the container 12 within the "pool" of water 14.

In a current embodiment of the batch process apparatus 10, the electrodes 16 and 18 are formed from wire mesh screen, and have dimensions of about 1 inch square. The electrodes 16 and 18 are separated from one another by a distance of about 2 inches, and are most preferably arranged parallel to one another such that the "faces" of the electrodes 16 and 18 are oriented toward each other.

The mine waste water 14 is agitated by, for example, a magnetic stirring or agitating bar 20 that is also in the water pool 14. The container 12 is positioned over a stirring or agitating plate 22 to effect agitation of the solution 14. As described below, agitation is provided during the passage of current and is stopped after the addition of cellulose particles and a flocculating agent.

A current is applied to the electrodes 16 and 18 (thus resulting in generation of a potential across the electrodes). In a current apparatus, a potential of about 1.2 to about 1.5 volts is generated across the electrodes 16 and 18. This voltage is applied as direct current for a period of time sufficient to convert the desired metal ions in the solution 14 into colloidal metal and form a colloidal metal-containing composition. The remaining steps of the process, e.g., addition of cellulose particles and a flocculating agent, settling and separation, are carried out as described elsewhere herein.

As set forth above, FIG. 2 illustrates one embodiment of a continuous process system 110 for carrying out the present process. In this system 110, the mine waste water 112 is stored in a storage tank 114 to maintain a sufficient quantity of waste water for maintaining the process in a continuous mode. The waste water is transferred to a feed tank 116 by, for example a feed pump 118. Appropriate additives can be added to the waste water 112 in the feed tank 116, through an additive line 120 to, for example, adjust the pH value of the waste water 112 as necessary.

The waste water 112 is then transferred from the feed tank 116 to a first in a series of cells 122*a*–*e*. Preferably, the waste water is transferred from a bottom location of the feed tank 116. The cells 122*a*–*e* can be arranged in a series to convert metal ions to colloidal metal as the process progresses. As will be understood by those skilled in the art, as the process progresses from, for example cell 122*a* to cell 122*b*, the concentration of target metal ions in the decantate, as indicated at 124*a*, that is transferred from cell 122*a* to cell 122*b* is less than that charged to cell 122*a* and the concentration of colloidal metal is commensurately greater. That is, the process through the cells 122*a*–*e* converts the metal ions to colloidal metal, resulting in a series of increases in colloidal metal concentration and a series of decreases in metal ion concentration.

It is to be understood that although the solution transferred from a cell to a next cell, for example, the solution transferred from cell 122a to cell 122b, is referred to as "decantate" 124a, this solution need not be a decantate in a strict sense. Because of the nature of the colloid, the suspended particles can be distributed relatively evenly throughout the solution. To this end, the liquid transferred from one cell to the next can be drawn from a variety of locations along the height of the cell and is referred to as decantate to distinguish it from other liquids or solutions present in the system 110. In addition, it is contemplated that in a large scale continual or continuous process, the decantate 124a–e will be gravity fed from one cell to a next cell.

In each of the cells 122a–e, the same general process steps are carried out. A current is applied to the solution 112 by electrodes 126a–e and 128a–e as the solution undergoes agitation. In a current apparatus, the negative electrodes or anodes 126a–e are formed from aluminum screen having a surface area of about 25 square inches and the positive electrodes or cathodes 128a–e are formed from stainless steel screen having a surface area of about 25 square inches. The electrodes 126a–e and 128a–e are oriented facing one another in each of the cells 122a–e and are separated from one another by a distance of about 2 inches.

Agitation is provided by agitator bars 130a–e positioned in each of the cells 122a–e. The agitator bars 130a–e can be of the magnetic type and stirring motion can be induced by an agitator plate 132a–e associated with each of the bars 130a–e. As set forth above, in each successive cell, the concentration of colloidal target metal increases and the concentration of target metal ions decreases. Agitation maintains the concentration of each the colloidal metal and metal ion relatively constant throughout the solution (i.e., maintains the solution relatively homogenous) in any particular cell.

Following conversion of the metal ions into colloidal metal, the solution 112 is transferred to a mixing tank 134, in which a slurry of cellulose particles 136, such as macerated paper pulp, is admixed with the colloidal metal along with a quantity of a flocculating agent 138, such as guar gum. The solution 112, pulp 136 and flocculating agent 138 are intimately mixed by, for example, a mixer 140. The resulting slurry 142 is transferred to a settling tank 144, by a pump 146. In the settling tank 144, the colloid-containing floc 148 of the slurry 142 settles to the tank 144 bottom, and clear liquid 150 is withdrawn from the top of the tank 144. The clear liquid 150 can then be discharged along with discharge water 152 from the separation step 154 described below.

The colloid-containing floc 148 is separated from the discharge water in, for example, a filter 154, to remove the discharge water form the colloid-containing floc 148. The discharge water is discharged, as indicated at 152. The colloid-containing floc 148 is subsequently dried. In a preferred process, the colloid-containing floc 148 is air dried. Those skilled in the art will recognize that various separation and drying methods and devices can be used to separate and dry the colloid-containing floc 148.

EXAMPLES

Without further elaboration, it is believed that one skilled in the art can, using the preceding description, utilize the present invention to its fullest extent. The following preferred specific embodiments are, therefore, to be construed as merely illustrative, and not limiting of the remainder of the disclosure in any way whatsoever.

Best Assay Procedure

It has found that the best assay procedure for calculation of the efficiency of a contemplated process is assay by nitrition. That procedure is described as follows:

| Reagents: | Apparatus: |
| --- | --- |
| Nitric acid | 1000 mL Beakers |
| Hydrochloric acid 1:1 | 1000 mL Graduates |
| Magnesium Powder Metal | 1000 mL Erlenmeyer Flasks |
| Sodium Hydroxide (no substitutes) | Buchner Filter Funnels, 12.5 cm |
| Sodium Carbonate | Funnel Rack |
| Whatman ® Filter Paper #42 or #41, 12.5 cm | Magnetic Stirring Bars |
| | Magnetic Hotplate Stirrers |
| Paper Pulp | Plastic Squirt Bottles, 250 mL |
| Sodium Chloride | |
| Distilled Water | Eye Droppers |
| Fullers Earth Filter and Sodium Bicarbonate (baking soda) | 100, 400, 600 mL Pyrex ® Beakers |
| | 1 Vacuum Pump |
| | 1 Pulp Balance |
| | Rubber Policeman |
| | Glass Stirring Rods |
| | Annealing Cups, 15 mL |
| | Porcelain Crucibles, low forms 30 mL |
| | Bunsen Burner or Propane Torch |

Procedure
1. Place one liter of acidified pH 2.0 water in a 1000 mL beaker, place on a stirring hotplate with a magnetic stirring bar.
2. Heat to 80 degrees C. and add 3.0 mg of magnesium metal powder, dispersed in water in three increments, stir until reaction has stopped.
3. Add 20 mL of 50% sodium nitrite solution and adjust the pH value to 5.5 with a 10% solution of sodium hydroxide. Add another 10 mL of 50% sodium nitrite solution.
4. Adjust the pH value to near pH 7.0, then add 10% sodium carbonate solution drop-wise to pH 8.0.
5. Permit to stand for at least one hour to permit reactions to go to completion.
6. Filter through a Whatman® #42 filter paper with paper pulp of fuller's earth on the filter.
7. Wash filter three times with distilled water, then wash the filter a number of times with 5% HCl to dissolve the hydroxides and wash them through the filter. Then wash the filter with distilled water to remove the acid.
8. Remove the filter and fire assay or ash the filter. Wrap the ash in silver-free test lead foil and cupel, and weigh.
9. Alternate: Digest the filter paper, the ash, or the gold bead in aqua regia with standard takedowns to remove nitrates and dilute for atomic absorption (AA), inductively coupled plasma (ICP) or directly coupled plasma (DCP) analysis.

Method Employed to Determine Process Effectiveness

In order to determine the effectiveness of the process in trials, and then to ascertain the economic potential in trial locations, a three-step procedure was employed.

First, the process was followed using a known quantity of gold dissolved in water that was initially distilled and known to be metal free. From the results of this procedure, a tentative effectiveness of 93–98 percent was calculated.

Second, a known quantity of gold was added to water samples collected in natural environments. The production from this procedure proved that the process works on naturally occurring water. A computed value was determined for the original gold content in the water using the ranges from the previous procedure and the amount produced. Gold recovery from these samples ranged from 75 to 93 percent. From the results of this procedure, the process was shown to work on natural water with comparable effectiveness.

Third, the calculated value in the previous procedure was used to forecast the outcome of the process when applied to water from the same sample but without any addition of known quantities of gold. The process was then executed and the outcomes were as predicted, yielding the conclusion that the process works on naturally occurring water with comparable efficiencies to laboratory solutions. Gold recovery from one liter batch processes using mine water waste collected from a mine and the mine waste water obtained from a stream contaminated by mine run off (below) ranged from 68 to 90 percent.

Use of this latter technique in a model continuous electrification process with the apparatus illustrated in FIG. 2 is discussed below. The process of obtaining a colloid-forming metal from mine waste water, in this case a small stream containing runoff from a gold mine, was carried out as follows. Approximately 400 gallons of water from the stream were collected on each of several occasions. The concentration of gold in each of the 400 gallon samples was determined for each sample prior to any recovery steps being carried out. The pH value of the sample was adjusted to between 4.0 and 6.5. The water sample (320 gallons) was placed into the surge tank and fed serially by gravity to each of the five electrification cells at a rate adjusted to be 4 gallons per minute.

Each electrification cell comprised a five gallon bucket that contained a 25 inch square aluminum screen anode and a 25 inch square stainless steel screen cathode. The anodes and cathodes were separated by 2 inches. Each bucked was placed upon a magnetic stirrer and the aqueous solution was vigorously stirred magnetically. Direct current was applied to each cell from a battery charger connected to a rheostat and volt meter.

On passage of the electrified aqueous composition from the cells into the mix tank, a slurry of macerated paper pulp was added to the mix tank along with a small amount of flocculating agent, here guar gum. The resulting slurry was stirred mechanically to contact the colloidal gold with the paper pulp particles and initiate precipitation of the solid phase floc dispersed in the liquid phase.

The slurry was then pumped into a 400 gallon settling tank and the phases were permitted to separate by gravity. The upper, liquid phase was decanted, leaving the solid phase and some water. In this case, the upper liquid phase was not clear as it can be from other sites and was discarded for convenience rather than being filtered as in a commercial process. For convenience, the pH value was not further adjusted toward neutrality as would also be done in a commercial process.

The solid phase containing the slurry was filtered on a 15 inch diameter filter plate and then dried in place for one day.

An appropriate crucible was loaded with a first layer of flux, followed by a layer of shredded filter cake and another layer of flux, with a total of 30 grams of flux being used. The crucible was heated gently to char the paper and then more vigorously to melt the gold and lead from the char-reduced flux into beads. The beads were collected, weighed and assayed.

The variables of initial gold in the stream water, adjusted pH value and volts applied during the flow are shown in the table below.

| Run Number | Initial Gold (mg/L) | Adjusted pH Value | Volts Applied |
|---|---|---|---|
| 1 | 0.408 | 4.2 | 1.2 |
| 2 | 1.008 | 4.8 | 1.4 |
| 3 | 0.888 | 4.2 | 1.4 |
| 4 | 0.545 | 4.4 | 1.4 |
| 5 | 0.556 | 4.2 | 1.2 |
| 6 | 0.450 | 4.6 | 1.8 |
| 7 | 0.0468 | 4.2 | 1.4 |
| 8 | 0.0307 | 4.6 | 1.4 |
| 9 | 0.663 | 4.2 | 1.4 |
| 10 | 0.445 | 4.4 | 1.2 |
| 11 | 1.379 | 4.2 | 1.4 |
| 12 | 0.724 | 4.6 | 1.6 |

From the foregoing, it will be observed that numerous modifications and variations can be effectuated without departing from the true spirit and scope of the novel concepts of the present invention. It is to be understood that no limitation with respect to the specific examples presented is intended or should be inferred. The disclosure is intended to cover by the appended claims all such modifications as fall within the scope of the claims.

What is claimed:

1. A process for obtaining a desired colloid-forming metal from a solution containing that metal in ionic form that comprises the steps of:

(a) providing an aqueous mine waste water solution containing a desired colloid-forming metal in ionic form having a pH value of about 4.0 to about 6.5;

(b) passing direct current at about 1.2 to about 2 volts through the solution for a time period sufficient to convert the desired metal ions into colloidal metal and form a colloidal metal-containing composition;

(c) agitatingly admixing cellulose particles with the colloidal metal-containing composition to form an agitated slurry of cellulose particles admixed with the colloidal metal;

(d) admixing a flocculating agent with the agitated slurry to form a settling composition containing a cellulosic floc;

(e) maintaining the settling composition in the absence of agitation for a time period sufficient to form two phases, a first phase that contains water and a solid phase comprising colloidal metal entrapped within a cellulosic floc and a second liquid discharge water phase having a reduced concentration of desired metal;

(f) separating the solid and liquid phases;

(g) drying the solid phase; and (h) fluxing the solid phase and heating the fluxed solid phase to a temperature sufficient to melt the colloidal metal present to form larger particles of the desired metal and to burn off the cellulosic floc.

2. The process according to claim 1 including the further step of (i) collecting the larger particles of the desired metal.

3. The process according to claim 1 wherein said cellulose particles are waste news papers that have been macerated in water to form a pulp.

4. The process according to claim 3 wherein said separated discharge water is separated from the solid phase by filtration or centrifugation.

5. The process according to claim 1 wherein said pH value is about 4.0 to about 5.0.

6. The process according to claim 1 wherein said mine waste water contains about 0.005 to about 1.5 milligrams per liter (mg/L) of said desired metal in ionic form.

7. A process for obtaining a desired colloid-forming metal from a solution containing that metal in ionic form that comprises the steps of:

(a) providing an aqueous mine waste water solution containing a desired colloid-forming metal in ionic form present in a concentration of about 0.005 to about 1.5 milligrams per liter and having a pH value of about 4.0 to about 5.0;

(b) passing direct current at about 1.2 to about 1.8 volts through the solution for a time period sufficient to convert the desired metal ions into colloidal metal and form a colloidal metal-containing composition;

(c) agitatingly admixing cellulose particles of waste news papers that have been macerated in water to form a pulp with the colloidal metal-containing composition to form an agitated slurry of cellulose particles admixed with the colloidal metal;

(d) admixing a flocculating agent with the agitated slurry to form a settling composition containing a cellulosic floc;

(e) maintaining the settling composition in the absence of agitation for a time period sufficient to form two phases, a first phase that contains water and a solid phase comprising colloidal metal entrapped within a cellulosic floc and a second liquid discharge water phase having a reduced concentration of desired metal;

(f) separating the solid and liquid phases by filtration or centrifugation;

(g) drying the solid phase;

(h) fluxing the solid phase and heating the fluxed solid phase to a temperature sufficient to melt the colloidal metal present to form larger particles of the desired metal and to burn off the cellulosic floc; and (i) collecting the larger particles of the desired metal.

8. The process according to claim 7 including the further step of (j) returning the separated discharge water to the source from which said aqueous mine waste water solution was obtained.

9. The process according to claim 8 wherein said separated discharge water is returned to said source at a down stream position relative to the position from which said aqueous mine waste water solution was obtained.

10. The process according to claim 7 wherein said fluxed solid phase is first heated at a lower temperature sufficient to char the cellulosic floc and then heated at a higher temperature sufficient to melt the flux and colloidal metal present to form said larger particles.

11. The process according to claim 7 wherein said flocculating agent is guar gum.

12. The process according to claim 7 wherein said separated discharge water is separated from the solid phase by filtration.

13. The process according to claim 7 wherein said colloid-forming metal is selected from the group consisting of gold, silver and the platinum group of metals.

14. The process according to claim 7 wherein the pH value of said provided aqueous mine waste water solution is obtained by upward adjustment of pH value of a natural aqueous mine waste water solution by addition of a water-soluble base.

15. A process for obtaining a desired colloid-forming metal from a solution containing that metal in ionic form that comprises the steps of:

(a) providing an aqueous mine waste water solution containing a desired colloid-forming metal in ionic form present in a concentration of about 0.005 to about 1.5 milligrams per liter and having a pH value of about 4.0 to about 5.0, said desired metal being selected from the group consisting of gold, silver and the platinum group of metals;

(b) passing direct current at about 1.2 to about 1.8 volts through the solution for a time period sufficient to convert the desired metal ions into colloidal metal and form a colloidal metal-containing composition;

(c) agitatingly admixing cellulose particles of waste news papers that have been macerated in water to form a pulp with the colloidal metal-containing composition to form an agitated slurry of cellulose particles admixed with the colloidal metal;

(d) admixing guar gum as a flocculating agent with the agitated slurry to form a settling composition containing a cellulosic floc;

(e) maintaining the settling composition in the absence of agitation for a time period sufficient to form two phases, a first phase that contains water and a solid phase comprising colloidal metal entrapped within a cellulosic floc and a second liquid discharge water phase having a reduced concentration of desired metal;

(f) separating the solid and liquid phases by filtration;

(g) drying the solid phase;

(h) fluxing the solid phase and heating the fluxed solid phase at two temperatures, wherein said fluxed solid phase is first heated at a lower temperature sufficient to char the cellulosic floc and then heated at a higher temperature sufficient to melt the flux and colloidal metal present to form larger particles and to burn off the cellulosic floc;

(i) collecting the larger particles of the desired metal; and (j) returning the separated discharge water to the source from which said aqueous mine waste water solution was obtained at a down stream position.

16. The process according to claim 15 wherein the pH value of said separated discharge water is adjusted toward neutrality prior to being returned to said aqueous mine waste water solution source.

17. The process according to claim 15 wherein said desired colloid-forming metal is gold.

18. The process according to claim 15 that is carried out continuously.

19. The process according to claim 15 that is carried out batch-wise.

20. The process according to claim 15 that is carried out continually.

* * * * *